United States Patent [19]

Schwartz

[11] Patent Number: 4,948,621

[45] Date of Patent: Aug. 14, 1990

[54] COMPOSITION FOR TREATMENT MEAT

[75] Inventor: Barry Schwartz, Yardley, Pa.

[73] Assignee: FMC Corporation, Philadelphia, Pa.

[21] Appl. No.: 350,861

[22] Filed: May 12, 1989

[51] Int. Cl.$^5$ .............................................. A23B 4/02
[52] U.S. Cl. .................................... 426/652; 426/264; 426/266; 426/332; 426/641
[58] Field of Search ............... 426/264, 266, 281, 332, 426/641, 646, 652; 423/305, 315

[56]  References Cited

U.S. PATENT DOCUMENTS

| | | | |
|---|---|---|---|
| 3,104,170 | 9/1963 | Mahon | 426/332 |
| 3,104,978 | 9/1963 | Elder | 426/652 |
| 3,130,002 | 4/1964 | Fuchs | 422/18 |
| 3,462,278 | 8/1969 | Mahon | 426/541 |
| 3,595,679 | 7/1971 | Schoch et al. | 426/264 |
| 3,689,283 | 9/1972 | May et al. | 426/324 |
| 3,741,777 | 6/1973 | Wrobel et al. | 426/281 |
| 4,781,934 | 11/1988 | Shimp et al. | 426/264 |

*Primary Examiner*—Donald E. Czaja
*Assistant Examiner*—Evan Federman
*Attorney, Agent, or Firm*—R. E. Elden; F. Ianno

[57]  ABSTRACT

A composition is provided of inorganic polyphosphates which will form a clear, stable solution suitable for injection into meat products. The composition comprises sodium tripolyphosphate and a long-chain glassy phosphate in sufficient quantities to provide 92 to 85 parts by weight sodium tripolyphosphate and 8 to 15 parts by weight of long-chain glassy phosphate, said long-chain glassy phosphate having a degree of polymerization of about 20 to 30, an average mole ratio of $(Na_2O + H_2O)/P_2O_5$ below about 1.067, and preferably possessing terminal groups on the polyphosphate chain having no less than about 75% OH with the remainder being ONa.

11 Claims, No Drawings

COMPOSITION FOR TREATMENT MEAT

The present invention is a composition for treating meat by injection.

Inorganic phosphates have been recognized as useful compositions to treat meat products.

U.S. Pat. No. 3,104,978 to Elder discloses the use of hydrated crystalline and glassy phosphates in meat curing compositions wherein the phosphate has a $Na_2O/P_2O_5$ ratio of between about 1.8/1 and 1.95/1. U.S. Pat. No. 3,104,170 to Mahon teaches fresh or precooked poultry may be better preserved in the cooked state by soaking the uncooked poultry in sodium or potassium polyphosphates having a $H_2O:P_2O_5$ ratio ranging from 0.9–2.0:1. The preferred polyphosphate is tripolyphosphate, but pyrophosphates and hexametaphosphates are also useful. In U.S. Pat. No. 3,689,283 a mixture of sodium tripolyphosphate and 10% sodium hexametaphosphate is preferred. U.S. Pat. No. 3,462,278 to Mahon teaches cooking old poultry (more than 10 months old) in a solution of the same alkali metal polyphosphates.

U.S. Pat. No. 3,573,062 to Paynter et al. teaches that coarsely chopped muscle meat can be bonded with polyphosphates to fabricate cuts of meat.

The U.S. government regulations permit the use of such phosphates for treating meats, but 9 C.F.R. 318.7 requires that only clear phosphate solutions may be injected into meat products.

Unexpectedly it has been found that pickling solutions prepared from polyphosphate solutions previously employed do not remain clear on standing but become turbid or even form precipitates, particularly when maintained at elevated temperatures. Such pickling solutions cannot be injected into meat products and instead must be discarded. This is not only economically wasteful, but also is undesirable on environmental grounds.

The present invention which overcomes the deficiencies of the prior art is a composition suitable for preparing a clear, aqueous polyphosphate solution comprising 8 to 15 parts by weight long-chain glassy phosphate, said long-chain glassy phosphate having a degree of polymerization of about 20 to 30, an average mole ratio of $(Na_2O+H_2O)/P_2O_5$ between about 1.067 and 1.1, and preferably possessing terminal groups on the polyphosphate chain having no less than about 75% OH with the remainder being ONa, and 92 to 85 parts by weight sodium tripolyphosphate, said composition forming a stable, clear solution when dissolved into an aqueous solution suitable for injecting into meat products.

A long-chain glassy phosphate suitable for use in this invention is marketed under the tradename Glass H phosphate by FMC Corporation and its method for manufacture is taught in U.S. Pat. No. 3,130,002 to Fuchs.

The preferred composition of this invention comprises about 10% long-chain glassy phosphate and about 90% sodium tripolyphosphate. The scope of this invention is intended to include the composition admixed with other meat pickling additives, aqueous solutions prepared from the compositions containing 8 to 15 parts by weight of the long-chain glassy phosphate and 92 to 85 parts by weight sodium tripolyphosphate (STPP). Clear aqueous pickling solutions may be prepared containing from about 16% by weight polyphosphates to substantially 0%. The effective practical concentration range for the composition of this invention is about 1% to 16% by weight, preferably about 2% to 16%. Clearly the effect of sodium or hydrogen terminal groups, OH or ONa, will only have an effect on the pH of the solution. The composition containing no less than 75% OH terminal groups is preferred because it is available commercially as Glass H brand phosphate.

The invention consists of a physical blend of STPP and long-chain glassy phosphate. The components can be blended in a number of methods well known to those in the field, for instance PK Blender, Ribbon Blender, or even by the mixture of both components in a screw conveyor, as well as any other convenient mixing means.

In the meat industry, mixtures of phosphate, salt, sugar, sodium erythorbate, sodium nitrite and spices are prepared in water to form curing pickles. These are added to meat by injection, soaking or tumbling the meat with the solution until the solution is absorbed by the meat. At certain levels of phosphate and salt, the solution is not stable, causing turbidity or a precipitate in the solution. Typically the phosphate used in such pickles is sodium tripolyphosphate, which is used to increase the water binding capacity of the meat, as well as improve the flavor, odor and texture of the meat.

The cause or nature of the turbidity or precipitation which forms in these pickles is not known. However, the following examples illustrate to one skilled in the art the best mode of practicing the invention to obtain stable solution suitable for injection into meat products.

EXAMPLE 1

Poultry Pickle

A typical poultry pickle was prepared using the following recipe: 4.41%–8% phosphate (total), 16.5% NaCl, 5.51% sucrose, 73.57–69.98% water. For each increasing percentage of phosphate used (4.41, 5, 7, 8), the phosphate was dissolved in the corresponding amount of water in a beaker with a magnetic stir bar. To this the 16.52% salt was added and dissolved. Sucrose at the 5.51% level was then added and stirred to complete dissolution. The solution was observed for turbidity and/or particles settling out. Data was obtained on the solution: during preparation (each step of the process), at the end of the first day (the day in which the solution was made), and at the start of the second day. All percentages are by weight.

The phosphates employed and the results are presented as Table I. STPP remained soluble up to the 4.41% phosphate level with 16.5% salt, while at higher concentrations, it precipitated. STPP/Glass H blends showed more stability than other blends at all concentrations. At the 4.41% level, STPP/Glass H phosphate blends remained clear throughout the first day and in some cases through the second. Meanwhile, STPP/Sodaphos phosphate blends demonstrated less stability than any of the other blends and became turbid approximately two hours after preparation. This general tendency was also seen at the 5% level. At the higher phosphate concentrations, the superiority of the 90/10 Glass H blends was illustrated by their clarity through the first day, while the other blends became turbid or developed a precipitate.

Sodaphos phosphate is the trademark of FMC Corporation's alkali metal glassy phosphate having an average chain length of about 6.

EXAMPLE 2

A study was made comparing STPP alone and the preferred 90/10 blend of STPP and long-chain glassy phosphate (Glass H brand) in the presence of salt. The results are presented as Table II. The table shows the blend is more soluble than the STPP alone (16% phosphate) at all concentrations, particularly in the presence of salt.

It was found that the compositions were soluble in hard water without turbidity and that solutions could be maintained at elevated temperatures of 30° C. without turbidity.

TABLE I

POULTRY PICKLE SOLUTIONS WITH VARIOUS PHOSPHATE CONCENTRATIONS
with: 16.52% salt
5.51% sugar
Variable Phosphate Levels

| | 4.41% Phos. | | | 5.0% Phos. | | | 7.0% Phos. | | | 8.0% Phos. | |
|---|---|---|---|---|---|---|---|---|---|---|---|
| | During Prep | 1st Day | 2nd Day | During Prep | 1st Day | 2nd Day | During Prep | 1st Day | 2nd Day | During Prep | 1st Day |
| Phase II STPP | c | p | p | t− | t | p | s | — | — | s | — |
| Nutrifos B-90(TM Monsanto) | c | c | p | c | c | p− | c | p− | p | c | p− |
| Curafos 11-2(TM Stauffer) | c | c | p | c | c | p | c | t | p | c | t |
| FMC Blend 90/10 STPP/ Glass H* | c | c | c | c | c | c | c | c | t− | c | c |
| Lab 90/10 STPP/SHMP Blend | c | c | p− | c | c | p | c | t | p− | t | p− |
| 95/5 STPP/Sodaphos* | c | t | p | c | t | p | t | p | p | t+ | p |
| 90/10 STPP/Sodaphos* | c | t | p | c | t | p | c | t | p | c | p |
| 85/15 STPP/Sodaphos* | c | t− | p | c | c | p | c | t+ | p− | c | t− |
| 95/5 STPP/Glass H* | c | c | p− | c | p− | p− | c | t | p− | c | t |
| 90/10 STPP/Glass H* | c | c | c | c | c | p− | c | p− | p− | c | c |
| 85/15 STPP/Glass H* | c | c | p− | c | c | c | c | c | p | c | c |
| Kena FP-28 (TM Stauffer) | c | c | p− | c | c | p− | t | p | p | t | p |

Key:
c = clear
p = precipitate
p+ = large amount of precipitate
p− = small amount of precipitate
t = turbid
t+ = very turbid
t− = slightly turbid
*Glass H is a trademark of FMC Corporation long chain glassy phosphate having a chain length of 20-30.
Sodaphos is a trademark of FMC Corporation's glassy phosphate having an average chain length of 6.

TABLE II

SOLUBILITY OF STPP AND A STPP-LONG-CHAIN GLASSY PHOSPHATE BLEND WITH NaCl
STPP Blend Used: 90/10 STPP/Glass H Glassy Phosphate

| Total % Phosphate | % Salt in STPP Solution | % Salt in Blend Solution |
|---|---|---|
| 15.6 | — | 0.0 |
| 14.1 | 0.0 | — |
| 14.0 | — | 6.0 |
| 12.0 | 4.0 | 13.0 |
| 10.0 | 7.5 | 16.0 |
| 8.5 | 9.5 | — |
| 7.0 | 10.0 | 20.5 |
| 6.0 | 12.0 | — |
| 5.0 | 13.0 | 24.0 |
| 4.4 | 15.5 | 24.5 |
| 2.5 | 18.0 | 25.5 |

I claim:

1. Composition suitable for preparing a clear, aqueous polyphosphate solution comprising, 8 to 15 parts by weight long-chain glassy phosphate having a degree of polymerization of about 20 to 30, an average mole ratio of $(Na_2O+H_2O)/P_2O_5$ between about 1.067 and 1.1, and 92 and 85 parts by weight sodium tripolyphosphate, said composition forming a stable, clear solution when dissolved into a aqueous solution suitable for injecting into meat products.

2. The composition of claim 1 comprising about 10 parts by weight long-chain glassy phosphate and 90 parts by weight sodium tripolyphosphate.

3. A clear, aqueous solution comprising 2% to 16% by weight polyphosphates, said polyphosphates comprising 8 to 15 parts by weight long-chain glassy phosphate, said long-chain glassy phosphate having a degree of polymerization of about 20 to 30, an average mole ratio of $(Na_2O+H_2O)/P_2O_5$ between about 1.067 and 1.1, and 92 to 85 parts by weight sodium tripolyphosphate.

4. The clear, aqueous solution of claim 3 wherein the phosphate comprises about 10 parts by weight long-chain glassy phosphate and 90 parts by weight sodium tripolyphosphate.

5. A polyphosphate composition comprising sodium tripolyphosphate and a long-chain glassy phosphate, in sufficient quantity to provide from 92 to 85 parts by weight sodium tripolyphosphate and the balance of 8 to 15 parts by weight of long-chain glassy phosphate for each 100 parts by weight polyphosphate, said long-chain glassy phosphate having a degree of polymerization of about 20 to 30, an average mole ratio of $(Na_2O+H_2O)/P_2O_5$ between about 1.067 and 1.1.

6. The composition of claim 5 comprising sufficient added aqueous liquid to provide a clear, aqueous solution containing 1% to 16% by weight polyphosphate.

7. The composition of claim 5 wherein the polyphosphates are present in the ratio of about 90 parts by weight sodium tripolyphosphate and about 10 parts by weight long-chain glassy phosphate.

8. The composition of claim 6 wherein the polyphosphates are present in the ratio of about 90 parts by weight sodium tripolyphosphate and about 10 parts by weight long-chain glassy phosphate.

9. The composition of claim 6 wherein the clear solution also comprises up to 25% by weight salt.

10. The composition of claim 8 wherein the clear solution also comprises up to 25% by weight salt.

11. The composition of claim 5 wherein the terminal groups of the long-chain glassy phosphate has no less than about 75% OH groups with the remainder being ONa.

* * * * *